United States Patent [19]
Dowd et al.

[11] Patent Number: 5,267,090
[45] Date of Patent: Nov. 30, 1993

[54] AUTOMOBILE SUN VISOR VANITY MIRROR MODULE

[75] Inventors: James D. Dowd, Farmington Hills; Robert C. Burdick, Romulus, both of Mich.

[73] Assignee: United Technologies Automotive, Inc., Dearborn, Mich.

[21] Appl. No.: 257,652

[22] Filed: Oct. 14, 1988

[51] Int. Cl.$^5$ .............................. G02B 5/08; B60J 3/00; F21V 33/00
[52] U.S. Cl. .................................. 359/838; 359/844; 362/135; 362/141; 296/97.5
[58] Field of Search ............................ 296/97.1-97.13, 296/900, 901; 362/80, 74, 135-144; 350/600-608, 641, 627-633; 359/838-844, 871, 872, 877, 879

[56] References Cited

U.S. PATENT DOCUMENTS

| | | | |
|---|---|---|---|
| 4,000,404 | 12/1976 | Marcus | 362/135 |
| 4,075,468 | 2/1978 | Marcus | 296/97.5 |
| 4,227,241 | 10/1980 | Marcus | 296/97.5 |
| 4,364,597 | 12/1982 | Viertel et al. | 362/137 |
| 4,479,172 | 10/1984 | Connor | 362/135 |
| 4,486,819 | 12/1984 | Marcus et al. | 296/97.5 |
| 4,491,899 | 1/1985 | Fleming | 362/74 |
| 4,586,788 | 5/1986 | Hansen | 296/97.5 |
| 4,652,982 | 3/1987 | Flowerday | 296/97.5 |
| 4,710,856 | 12/1987 | Cheung | 362/135 |
| 4,721,310 | 1/1988 | Gavagan et al. | 296/97.5 |
| 4,760,503 | 7/1988 | VandenBerge et al. | 362/144 |
| 4,764,852 | 8/1988 | Sakuma | 362/135 |
| 4,803,602 | 2/1989 | Svensson | 362/135 |
| 4,879,637 | 11/1989 | Clark et al. | 362/144 |
| 4,909,562 | 3/1990 | Sakuma et al. | 296/97.5 |

FOREIGN PATENT DOCUMENTS

3427952  1/1986  Fed. Rep. of Germany ..... 296/97.5

Primary Examiner—Bruce Y. Arnold
Assistant Examiner—Thong Nguyen

[57] ABSTRACT

A lighted vanity mirror module for an automobile sun visor comprises a housing (35) including a base (40), a bezel (45) covering the base and supporting a mirror (20), and electric lamps (25) supplied with electric current through circuitry (55) embedded within the base. A hinged cover (30) is unlatched and the lamps energized by actuation of a single, combined latch and on-off switch (60). Interfitting lamp compartments (135) and (150) minimize light leakage into the interior of the housing, align the bezel with the base and provide fastening of the bezel to the base. A light dimming control (65) is also provided.

23 Claims, 6 Drawing Sheets

AUTOMOBILE SUN VISOR VANITY MIRROR MODULE

DESCRIPTION

1. Technical Field

This invention relates to vanity mirror of the type employed on automobile sun visors, and particularly, to a module including an electric lighting system with the vanity mirror.

2. Background Art

Vanity mirrors which mount to sun visors have long been a popular accessory in passenger automobiles. Typically, the mirror is mounted on the upper surface of the sun visor so that when the sun visor is swung downwardly to a sun shielding position, the mirror is aligned with the face of the driver or passenger for such uses as personal grooming and the like. Certain of such vanity mirrors have been provided in packages with lighting means thereon which light up the user's face for nighttime operation or to approximate ambient light conditions to be encountered by the user at his or her destination. One type of known lighted vanity mirror includes a pair of lights disposed at opposite ends of the mirror and a pivotable cover for covering the mirror and lights when not in use. Circuitry for the connection of the lights, including an on-off switch and possibly a dimming control is also provided in the mirror package. It has been found that such lighted vanity mirror packages can be improved upon in a number of respects.

One area of improvement needed in existing lighted visor vanity mirror packages is the electrical circuitry thereof. Oftentimes such circuitry comprises a plurality of wires connecting the lamps to switches and controls or a sheet metal stamping mounted on a board which is in turn mounted in a laminar arrangement with the mirror to the package housing. In either case, such electrical connections have proven to be time consuming in assembly, difficult to disassemble for servicing, and somewhat less than completely reliable due to the inherent dimensional variations between various contacts and connectors employed therewith.

Another area where current lighted vanity mirror packages have been found to be somewhat deficient is that of the mirror and mount therefor. As set forth hereinabove, the mirrors in such packages are sometimes mounted in a laminar arrangement with a circuit board which makes the replacement of the mirror in the event of its breakage difficult if not impossible without disassembly or replacement of the circuitry as well. Furthermore, certain existing lighted vanity mirror packages employ glass mirrors which are subject to accidental shattering even though mounted on foam backing.

Mirror covers in current lighted vanity mirror packages have also been found to be somewhat less than adequate. As set forth hereinabove, such covers are often hingedly mounted to the package along an edge thereof. In certain cases, such hinged mounts have been found to be complex and bulky, occupying space in the package which could be better used for other components, and, owing to the utilization of bosses and the like for retention of the hinge within the packages have been found to be not as durable as is perhaps desired. Furthermore, in certain lighted mirror packages, the cover may be closed over energized lamps which can lead to damage of the package due to heat build up under the cover or excessive discharge of the vehicle's battery. Also, with age and use, such covers have been prone to exhibit annoying vibration and rattling during operation of the vehicle. Furthermore, the covers are frequently held closed merely by spring force and are thus likely to be jarred open in the event of sudden vehicle accelerations or decelerations. Moreover, such covers often require additional manipulation from that required to turn on the lamps and therefore, in darkness, have been found to be somewhat inconvenient to use.

In general, there are various other aspects of present day lighted vanity mirror packages which lend themselves to improvement, particularly, in the methods by which such packages are assembled. Oftentimes, the package is assembled with a variety of separate fasteners such as screws, rivets or the like which are not only cumbersome and time consuming to install, but do not provide any significant measure of positive alignment between the component parts of the mirror package.

DISCLOSURE OF INVENTION

It is therefore an object of the present invention to provide an improved lighted vanity mirror module for an automobile sun visor, such module having an improved electrical circuit therein which is easily assembled, disassembled and serviced and operates with a high degree of reliability.

It is another object of the present invention to provide such an improved lighted mirror module wherein the mirror thereof is easily replaceable and generally shatterproof.

It is another object of the present invention to provide such an improved mirror module having a cover thereof which is compact and durable and is incapable of being closed over the module lights when the lights are energized.

It is another object of the present invention to provide such a mirror module having a cover which is generally free from rattles and vibrations, is maintained closed by a positive latching and does not require manipulation separate from that required to energize and de-energize the lamps.

It is another object of the present invention to provide such a mirror module which is easily assembled with a minimum number of fasteners and having components thereof which are self-aligned with one another upon assembly.

These and numerous other objects and advantages are achieved by the present invention wherein according to one aspect thereof, a cover for the mirror and lights is provided with a positive latch thereon actuated by a switch for the electric light circuit therewithin. Accordingly, the cover is opened and the lights energized with only one manipulation by the automobile's driver or passenger. The combined latch and switch is reset automatically with a closing of the cover, thereby extinguishing the lamps such that the cover may never be closed over the lamps when the lamps are energized thereby preventing overheating of the mirror module and resultant damage to the module as well as preventing discharge of the vehicle's battery. The cover's hinge is compact, light in weight, and very strong, being retained to the module by the reception of an integral hinge pin through apertures in the module housing. A bezel to which the mirror is mounted positively locks the hinge pins to the housing. The cover is generally rattle free being biased by a spring which provides an opening force when the latch is released.

In accordance with another aspect of the present invention, the mirror module is provided with improved electrical circuitry, spaced from the mirror and comprising a sheet metal member or stamping which is embedded within one of the walls of the housing for reliability as well as for maintenance of the alignment of various circuit contacts and terminals with other electrical components of the module. The circuit is embedded in the housing by such techniques as insert molding.

In accordance with another aspect of the present invention, the mirror of the module is formed from a shatterproof material such as an acrylic with a suitable silvered backing and mounted to the bezel as with an adhesive which remains somewhat pliable when cured. Such adhesive, coupled with the spacing of the mirror from the circuit allows the mirror to be easily replaced if damaged, while the shatterproof material from which the mirror is formed minimizes such a risk.

In accordance with yet another aspect of the present invention, the module comprises a minimum number of district parts with integral fastening means which are quickly assembled without separate fasteners, the parts providing a large measure of mutual alignment as they are assembled. For example, the bezel which supports the mirror additionally supports the lamps and includes integral light bulb cavities (housings) which align with mating housings on a base portion of the module housing to reduce unwanted light leakage to the interior of the housing and precise alignment between the bezel and base portion. The bezel is provided with means integral therewith for snap fastening to mating fastening means on the housing base portion. Likewise, the housing base portion is provided with apertures which receive mating snap hooks on the automobile's sun visor, whereby the module may be attached to the visor without tools, merely by snapping the module to the visor.

The module may be provided with a dimmer control utilizing a resistor conveniently assembled to the circuitry embedded within the module housing. The dimmer control can be located adjacent to one of the bulb housings which, if apertured, can provide a measured amount of back lighting to the dimmer control for visibility thereof in low ambient light conditions.

BEST MODE FOR CARRYING OUT THE INVENTION AND INDUSTRIAL APPLICABILITY THEREOF

Figure 1:
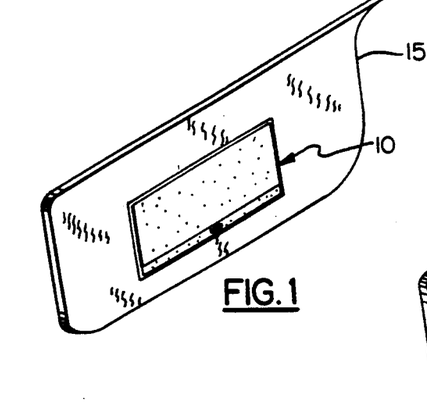
FIG. 1 is an isometric view of an automobile sun visor having the lighted vanity mirror module of the present invention mounted thereon.
Figure 2:
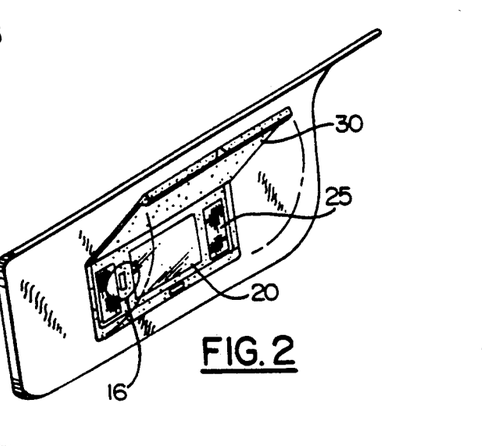
FIG. 2 is a view similar to FIG. 1 but showing a cover of the module raised to illustrate certain details of the interior of the module.
Figure 3:
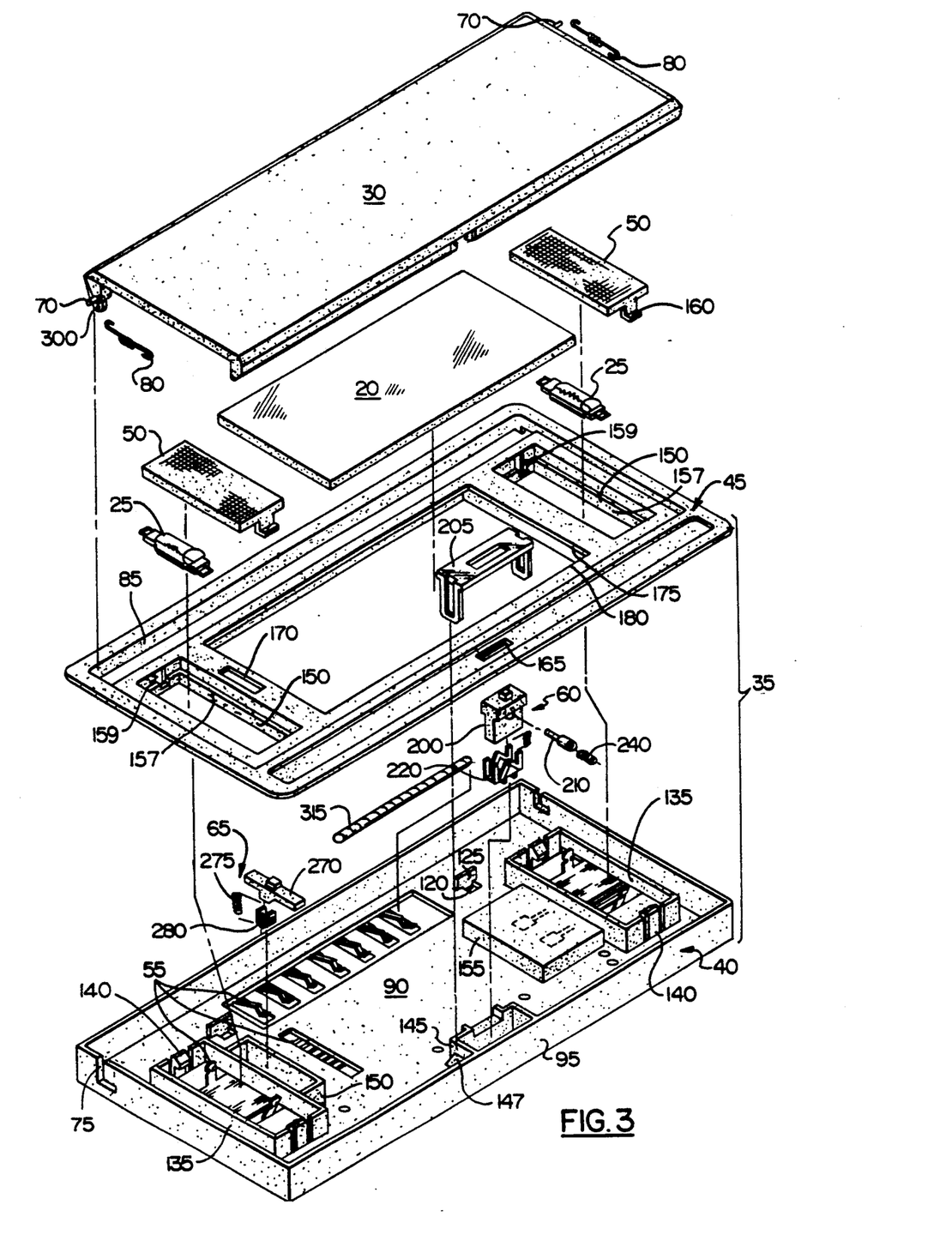
FIG. 3 is an exploded perspective view of the lighted mirror module.
Figure 4:
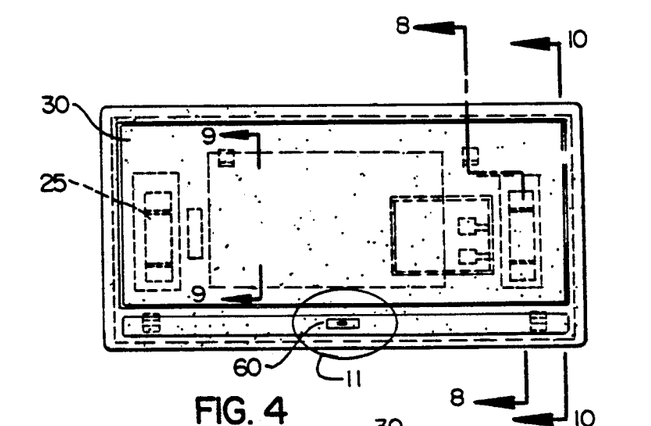
FIG. 4 is a front, plan view of the mirror module with the cover thereof shown in a closed position.
Figure 5:
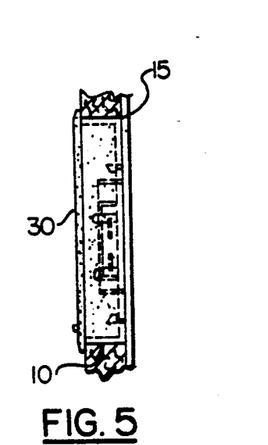
FIG. 5 is a side elevation of the mirror module showing its attachment to the sun visor.
Figure 6:
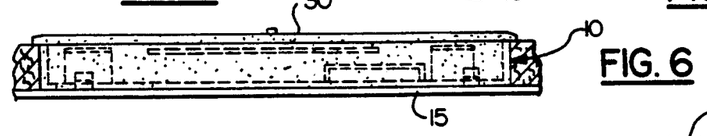
FIG. 6 is a bottom elevation of the mirror module.
Figure 7:
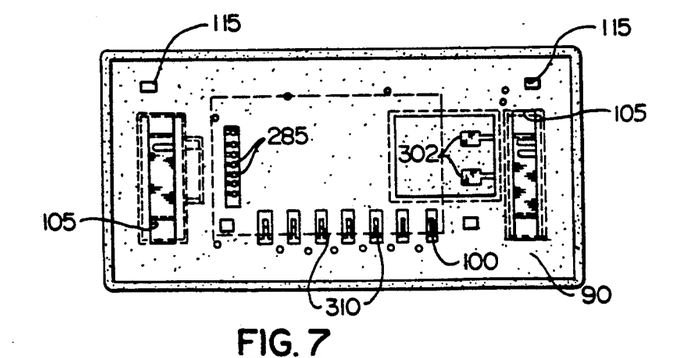
FIG. 7 is a plan view of the back of the mirror module showing the exposure of the various components of the electrical circuit thereof.

Referring to the drawings, and particularly FIGS. 1-3 thereof, the lighted vanity mirror module of the present invention is indicated generally at 10 and is shown mounted to a sun visor 15. As shown in FIG. 2, module 10 is provided with a mirror 20 by which one of the passengers of the automobile's may view himself, a pair of electric lights 25, one on either side of mirror 20 to light the face of a user and a hinged cover 30 sized to cover both the mirror and lights when not in use.

Figure 22:
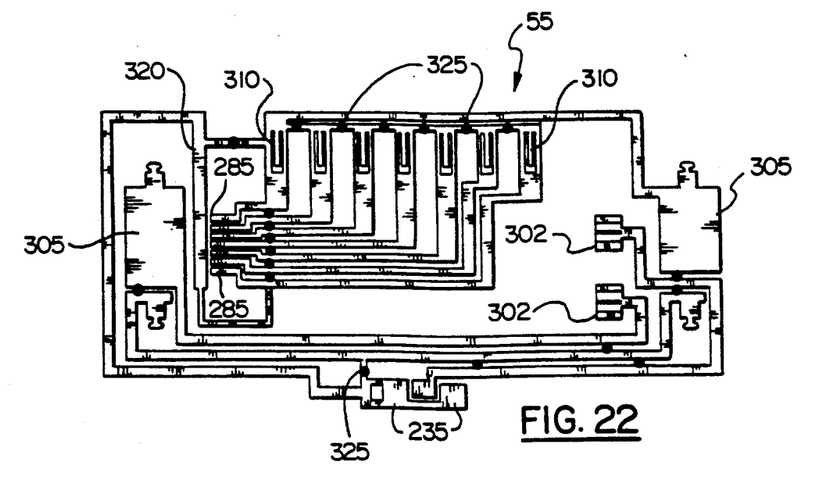
FIG. 22 is a front, plan view of circuitry employed in the lighted vanity mirror module of the present invention.

Broadly, the mirror module comprises a housing 35 including a base 40 and a bezel 45 which snap fits on the base in a manner to be described in more detail hereinafter. Bezel 45 comprises a forward wall of the housing and supports the mirror 20 and lenses 50 of electric lights 25. Base 40 has sheet metal circuitry 55 (shown in detail in FIG. 22) embedded in the rear wall thereof, the circuitry defining sockets and reflectors for the electric lamps and other electrical contacts and connectors. Base 40 also carries thereon combined cover latch and on-off switch 60 as well as a dimmer control 65 for adjustment of the intensity of lighting. Hinge pins 70 formed integrally with cover 30 are received within L-shaped slots 75 in base 40 and are retained therewithin by coil springs 80 which also provide an opening force for cover 30 when latch 60 is released. The engagement of bezel 45 with base 40 further retains pins 70 in slots 75, the cover extending through slot 85 in the bezel.

With respect to housing 35, base 40 is formed by molding such material as synthetic plastic into the generally rectangular box shape shown in FIG. 3. Accordingly, base 40 comprises a rear wall 90 and an upstanding sidewall structure 95 extending forwardly therefrom. Rearwall 90 is provided with various apertures 100, 105 and 110 through which circuitry 55 is exposed for testing and contact with the module's electric controls. Rear wall 90 is also provided with apertures 120 having tabs 125 upstanding from the edges thereof which cooperate with snap hooks 130 on visor 15 for mounting the mirror module to the visor (see FIG. 8). A pair of sidewall structures 135 extend forwardly from the rear wall of the base and define lamp compartments which include integral snap hooks 140 which engage with mating slots in the bezel for attachment of the bezel to the base. Various recesses (channels) 145 (having integral detents 147 provided therein), 150 and 155 are also formed in base 40 to accommodate terminals 65 of circuitry 55, the latch 60 and the dimmer control 65 respectively. Bosses 156 are integrally formed with rear wall 90 and provide attachment points for the ends of springs 80 (see FIGS. 10 and 11).

Bezel 45 may also be molded from synthetic plastic and includes rearwardly extending sidewall structures 152 each being slotted at 159 at the ends thereof. In the assembly of the bezel to base 40, the bezel is merely pushed down over the base such that the bezel sidewall structures 157 are received within base sidewall structures 135, and snap hooks 140 are received within slots 159. The interengagement of the sidewall structures assures proper alignment of the two components and the interengagement of snap hooks 140 with slots 159 provides an effective attachment of these two components without ancillary fasteners. The bezel sidewall structures define a pair of lamp compartments which, along with the lamp compartments defined by base sidewalls 135 in which they nest, (interfit) minimize the amount of light leakage into the interior of the housing from lamps 25 which would otherwise be visible through the various seams between the components of the module and detract from the appearance thereof. However, in the event the backlighting of dimmer control 65 is desired, the lamp compartment wall can be dimensioned or apertured (not shown) to provide a select amount of leakage into the interior of the housing for such backlighting. Slots 155 in bezel lamp compartments 150 also receive hooked tabs 160 formed in the ends of lenses 50 for the attachment of the lenses to the bezel. Thus, the housing may be easily disassembled for servicing by first unsnapping the lenses from the bezel, thereby exposing the engagement of hooks 140 in the base with slots 155 in the bezel whereby the base hooks may be easily unsnapped from the bezel through the lamp compartments. Bezel 45 also includes apertures 165 and 170 through which the buttons for latch 60 and dimmer control 65 extend as well as a larger mirror opening 175 defined by a generally planar rim or frame 180.

Figure 9:
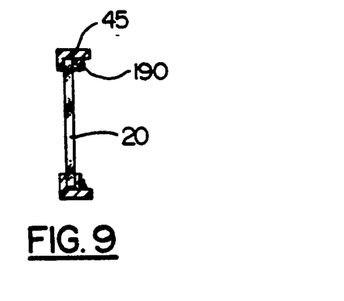
FIG. 9 is a sectional view taken along line 9—9 of FIG. 4.

Mirror 20 is formed from any suitable reflective material. In the preferred embodiment, the mirror comprises a sheet of acrylic material silvered on one side thereof for reflectivity and adhesively bonded to the interior of bezel frame 180 by a bead of adhesive such as silicone adhesive 190 which remains pliable when cured to accommodate different rates of thermal expansion and contraction between the bezel and the mirror (see FIG. 9).

Figure 14:
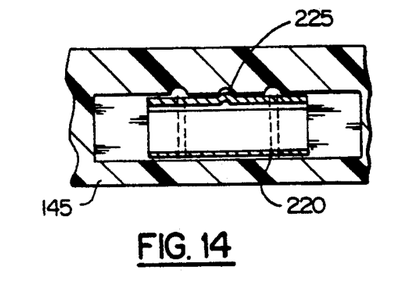
FIG. 14 is a sectional view taken in the direction of line 14—14 of FIG. 13.
Figure 15:
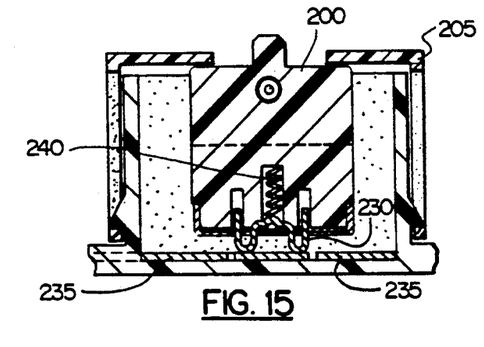
FIG. 15 is a sectional view taken in the direction of line 15—15 of FIG. 12.
Figure 19:
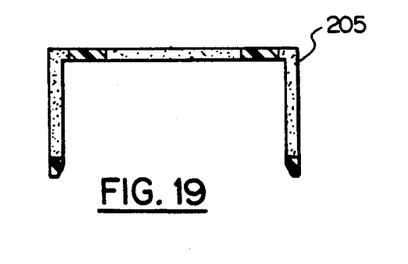
FIG. 19 is an enlarged elevation in partial section, of a clip employed in the latch and on-off switch shown in FIGS. 12-14.
Figure 20:
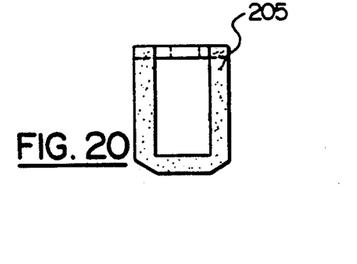
FIG. 20 is an enlarged elevation of the end of the clip shown in FIG. 19.
Figure 21:
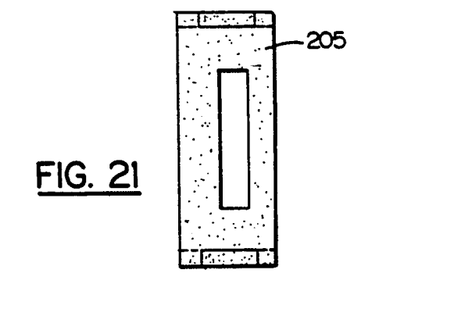
FIG. 21 is a front, plan view of the clip shown in FIGS. 19 and 20.

Referring to FIGS. 12-15, combined on-off switch and latch 60 comprises a carrier 200 slidably received within a channel 145, being retained within the interior of that channel by clip 205, (see FIGS. 19, 20 and 21). As best seen in FIGS. 3 and 15, clip 205 snaps onto detents 147. Carrier 200 is bored to received a latch pin 210 biased rearwardly by coil spring 215 which is retained within carrier 200 by clip retainer 220 provided with generally spherical detents 225 on the forward and rear faces thereof. In addition to maintaining the assembly of the latch pin with the carrier, retainer 220 also holds a two-lobed contact 230 on to the carrier, contact 230 being biased into engagement with on-off contacts 235 (seperated by an opening in the circuit) in circuitry 55 (see also FIG. 22) by a coil spring 240 received within another bore in carrier 200. As best seen in FIG. 15, channel 145 and carrier 200 are sized so that the carrier may be moved in either of two opposite directions whereby the lights may be turned on and the cover opened by manually moving the carrier to the left or right. Those skilled in the art will appreciate that with the provision of adequate resistance in circuitry 55, the module may be adapted to operation of the lights in a bright mode by moving carrier 200 in one direction and in a dimmer mode by moving the carrier in the opposite direction. As shown in FIG. 14, the interior of channel 145 is notched whereby the engagement by spherical detent 225 within the notches provides the user with a tactile indication of the position of carrier 200.

Figure 26:
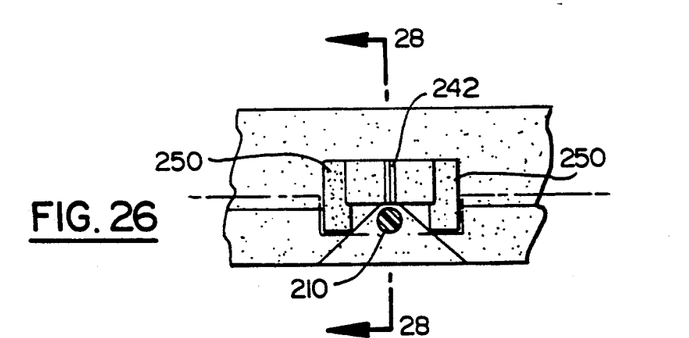
FIG. 26 is an enlarged sectional view, taken in the direction of line 26—26 of a latch pin and module cover shown in FIG. 13.
Figure 27:
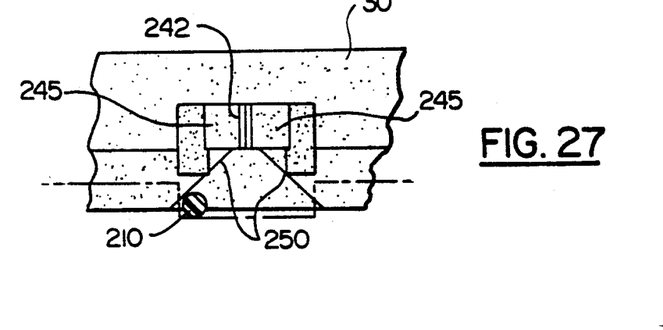
FIG. 27 is a view similar to that of FIG. 26 but showing the latch pin thereof in a different position.
Figures 28, 29:
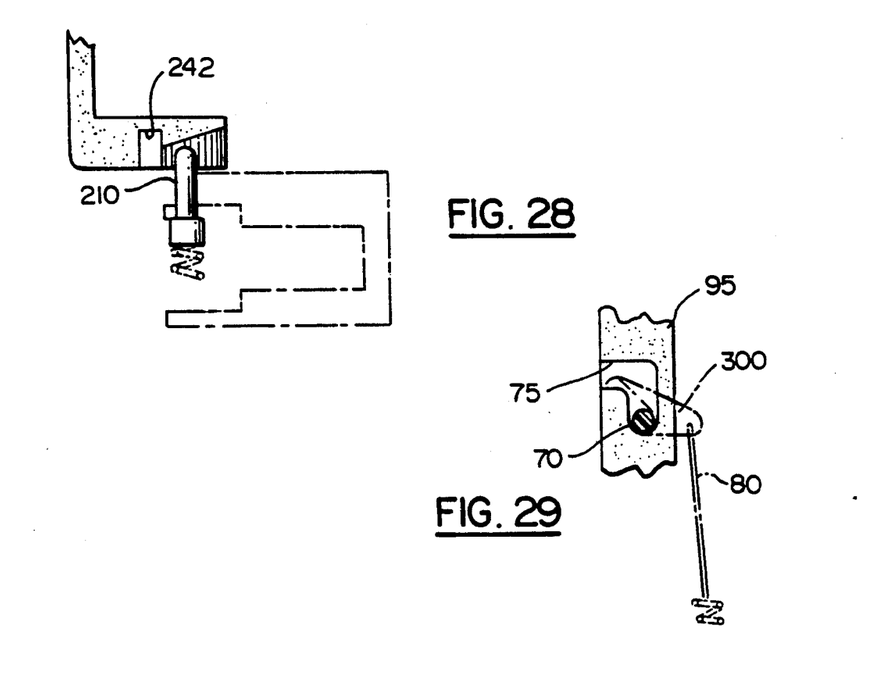
FIG. 28 is a sectional view taken in the direction of line 28—28 of FIG. 26.
FIG. 29 is an enlarged, fragmentary, side elevation of the lighted vanity mirror module of the present invention showing details of the cover hinge thereof.

Referring to FIGS. 26-28 as well as FIGS. 2 and 3, the free edge of cover 30 is provided with a recess 242 within which latch pin 210 is received for positively holding the cover closed when not in use. As shown in FIGS. 26 and 27, recess 242 communicates with a pair of oppositely sloping first camming surfaces 245 which retract pin 210, pushing the pin into carrier 200 as the carrier is moved either left or right with respect to the recess. When the carrier moves to either outer end of cam surfaces 245, it is brought into engagement with a slot 250 which allows unimpeded motion of the cover over the latch pin for opening of the cover by means of the bias thereon by springs 80. Thus, it is seen that cover 30 will open by movement of the latch carrier either to the left or right as contact 230 switches on the lamps. When the user wishes to close cover 30, the cover is merely pushed rearwardly, the cover making contact with latch pin 210 along second sloping cam surfaces 252 which center the pin and carrier, moving the pin toward recess 240. When the pin reaches the innermost end of cam surface 252, it snaps under the bias of spring 240 into engagement with recess 242 for locking the cover closed.

Figure 16:
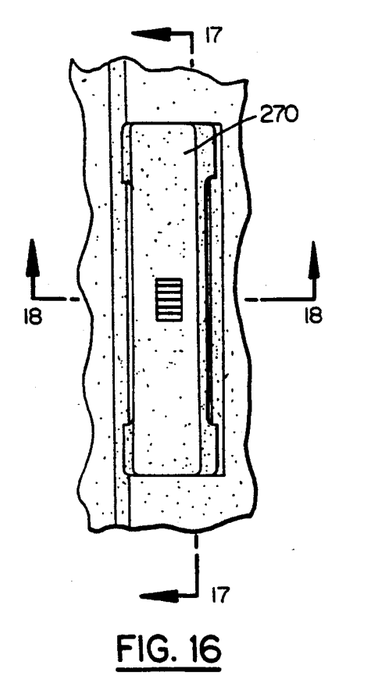
FIG. 16 is an enlarged front plan view of a dimmer control of the mirror module.
Figure 17:
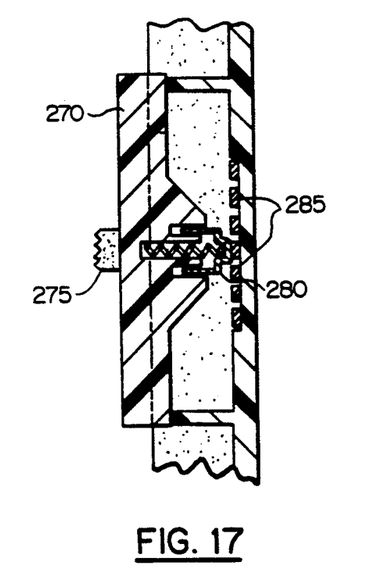
FIG. 17 is a sectional view taken in the direction of line 17—17 of FIG. 16.
Figure 18:
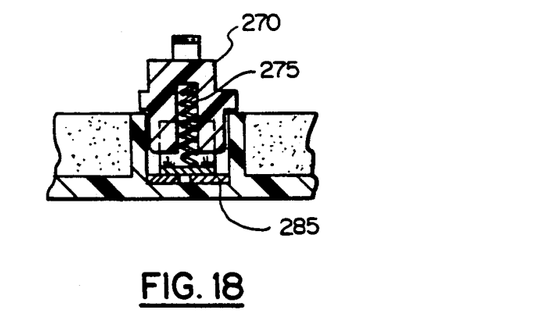
FIG. 18 is a sectional view taken in the direction of line 18—18 of FIG. 16.

As set forth hereinabove, dimmer control 65 is received within channel 150 in housing base 40. As best seen in FIGS. 16-18, the dimmer control comprises a hand operated carrier 270, an inner surface of which engages and is slidably supported on the forward edge of the channel. Carrier (controller) 270 is bored to receive coil spring 275 which urges electrical contact 280 inwardly into selective engagement with one of a multiplicity of dimmer contacts 285 provided in circuitry 55 (see FIG. 22).

Figure 8:
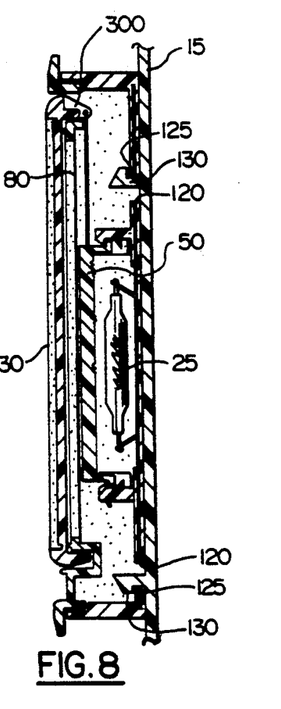
FIG. 8 is a sectional view taken along line 8—8 of FIG. 4.
Figure 10:
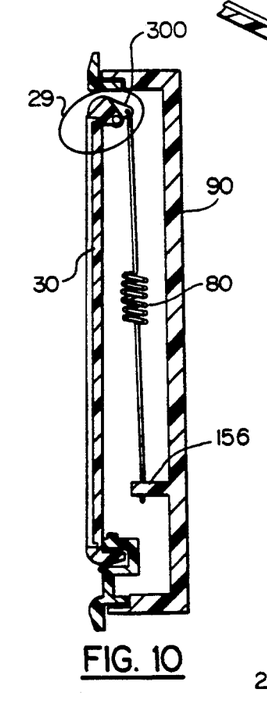
FIG. 10 is a sectional view taken along line 10—10 of FIG. 4.
Figure 11:
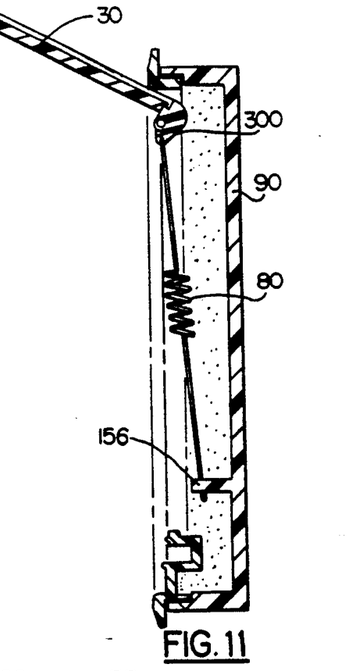
FIG. 11 is a view similar to FIG. 10 but showing the cover of the mirror module in an open position.
Figure 12:
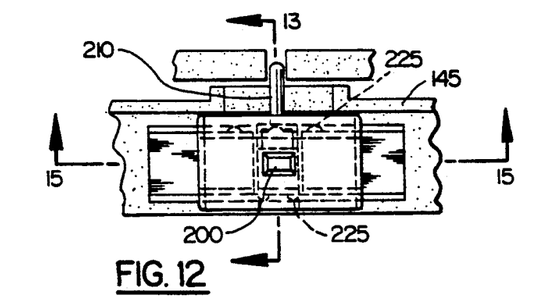
FIG. 12 is an enlarged, front plan view of a cover latch and lamp on-off switch of the mirror module.
Figure 13:
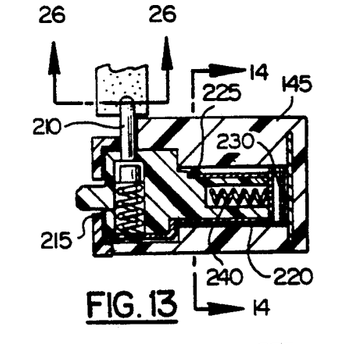
FIG. 13 is a sectional view taken in the direction of line 13—13 of FIG. 12.

Referring to FIGS. 8, 10 and 11, as set forth hereinabove, cover 30 is provided with integral hinge pins 70, extending outwardly from an upper edge thereof and received within L-shaped slots 75 formed within the sidewalls of base 40. The cover is also provided with integral lugs 300 at the hinged edge of the cover lugs 300 extending rearwardly from the cover (when the cover is in a closed position). The lugs are located proximally to hinge pins 70 and include holes which receive the end of coil springs 80 therethrough. The opposite end of coil spring 80 is hooked around bosses 157 provided in rear wall 90 of base 40 and retained thereon by the underside of the bezel. As best seen in FIGS. 10 and 11, when the cover is closed and latched, the coil spring is stretched slightly thereby keeping tension on the cover to avoid annoying rattles and vibrations therefrom due to vibration of the vehicle in which the module is employed. When latch 60 is released, spring 80 retracts thereby pivoting cover around hinge pins 70 to open the cover.

As best seen in FIG. 29, the spring also maintains the hinge pin in firm engagement with the closed end of L-shaped slot 75 provided in the base sidewall for effective retention of the hinge pins in the slots. Such retention is assured by the engagement of the edge of the bezel with the edge of the base sidewall structure 95.

Referring to FIGS. 22-25, circuitry 55 comprises a sheet metal stamping of stainless steel or other suitable conductor which, as set forth hereinabove, is embedded within rear wall 90 of base 40 by such techniques as insert molding or the like. Circuitry 55 comprises power and ground terminals 302, series connected bulb sockets 305 which include integral reflective and heat dissipating surfaces therein as well as a plurality of dimmer contacts 285, each of which connects to a corresponding one of several aligned resistor terminals (clips) 310. An elongate wire resistor 315 is threaded through the clips (see FIG. 25) to provide variable resistance and thus variable light dimming as dimmer contact 280 bridges select dimmer contacts 285 and elongate contact 320 to effectively adjust the resistance offered by resistor 315.

Figure 23:
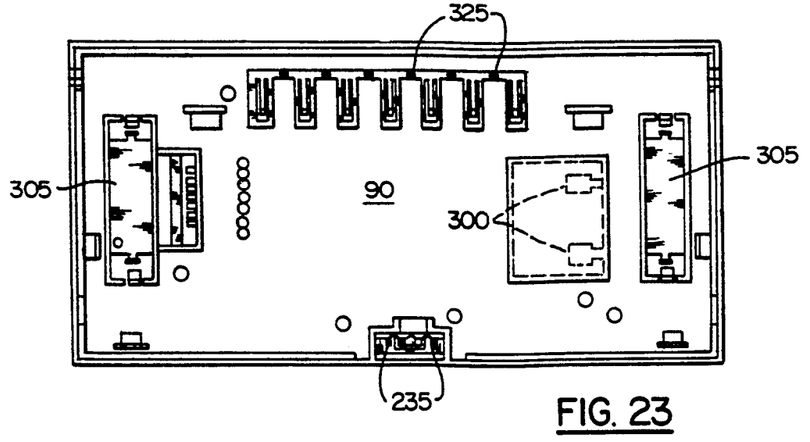
FIG. 23 is a front, plan view of a back wall of the base of the module's housing, showing the circuitry of FIG. 22 embedded therewithin.
Figure 24:
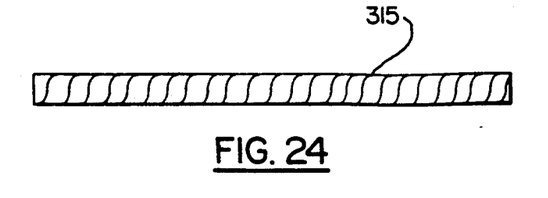
FIG. 24 is an elevation of a wire resistor employable in the circuitry shown in FIGS. 22 and 23.
Figure 25:
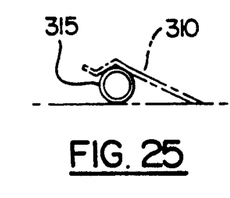
FIG. 25 is an end view of the resistor of FIG. 24 shown clipped to the circuitry of FIGS. 22 and 23.

As shown at locations 325, circuitry 55 may be formed from a minimal number of separate components which may be punched at selective locations 325 thereon to provide the desired openings in the circuit. As shown in FIG. 23, the circuitry may be punched subsequent to being embedded in rear wall 90 of the base. As set forth hereinabove, various openings may be left in rear wall 90 so that circuitry 55 may be accessed for electrical testing thereof.

It will be appreciated that the lighted vanity mirror module of the present invention overcomes many of the deficiencies exhibited in prior art vanity mirror packages. The combined latch and on-off switch coordinates electrical energization of the lights with the opening of the cover and prevents the lights from being left on with the cover closed, while positively retaining the cover closed when the mirror is not in use to ensure against accidental opening thereof when jarred. The circuitry of the mirror module employs a minimal number of components. Being embedded in the rear wall of the housing. The circuitry is extremely reliable, since accurate alignment of the various contacts thereof is ensured by the embedment of the circuitry in the housing wall. Additionally, the circuitry is well protected by the material of rear wall 90 to minimize the risk of damage thereto when the module is serviced. The attachment of the lid to the base sidewall structure is strong and reliable and due to the spring tension on the lid, relatively rattle-free. Since the lid pins are disposed outwardly from the lid, a minimum of housing interior volume is lost to the hinge construction. The acrylic mirror employed in the module is shatterproof, light in weight and spaced from the circuitry for ease in replacement. The mounting of the bezel to the base without ancillary fasteners provides ease of assembly and maintenance of proper alignment of all the component parts as well as preventing light leakage into the interior of the housing.

While a particular embodiment of the lighted vanity mirror module of the present invention has been described and illustrated, it will be appreciated that various modifications thereto may be made without departing from the invention herein and it is intended by the following claims to cover all such modifications as fall within the true spirit and scope of this invention.

Having thus described the invention, what is claimed is:

1. In a vanity mirror module for assembly to an automobile sun visor, said module comprising a housing, a mirror fixed to said housing, an electric circuit disposed within said housing and including at least one electric lamp for illuminating an object to be observed in said mirror, and an openable cover for covering said mirror and lamp when not in use, the improvement characterized by:

said cover including a detent engaging portion thereon;

a movable latch means disposed within said housing, adjacent an opening in said electric circuit;

said latch means including a detent engageable with said detent engaging portion of said cover for selectively opening and closing said cover; and said latch means further including an electric contact thereon which bridges said opening in said electric circuit when said detent is disengaged from said cover for simultaneously opening said cover and energizing said lamp.

2. The vanity mirror module of claim 1 characterized by said detent engaging portion of said cover comprising a recess in a free edge thereof and said detent comprising a pin longitudinally biased into engagement with said recess.

3. The vanity mirror module of claim 2 characterized by said latch means including:

a carrier which is manually actuatable in a lateral direction for opening said cover, said pin and said electric contact being attached to said carrier, and said recess communicating with at least one, first camming surface engageable by said pin for longitudinally retracting said pin from said recess for opening said cover as said pin is moved laterally along said recess by said lateral movement of said carrier.

4. The vanity mirror module of claim 3 characterized by said cover including at least one, second camming surface, adjacent said recess and engageable by said pin for returning said carrier and pin to an inactuated position thereof as said cover is closed.

5. The vanity mirror module of claim 4 characterized by said recess being open to an end of said second camming surface for the longitudinal insertion of said pin into said recess as said carrier and pin are cammed to said unactuated position by said second camming surface.

6. The vanity mirror module of claim 3 characterized by said housing having a channel formed therein, said carrier being slidably received within said channel, said channel being open at one side thereof to said electric circuit for the engagement thereof by said electric contact.

7. The vanity mirror module of claim 6 characterized by said electric contact being disposed on said carrier adjacent said open side of said channel; and
a retainer disposed on said carrier and fixing said contact to said carrier.

8. The vanity mirror module of claim 7 characterized by said channel including parallel sidewall portions including at least one recess therein, said retainer being biased outwardly into engagement with sidewall portions and provided with at least one detent engageable with said recess for rendering to an operator of the module, a tactile indication of the position of said latch.

9. In a vanity mirror module for assembly to an automobile sun visor, said module comprising a housing and a mirror fixed to said housing, and an openable cover for covering said mirror when not in use, the improvement characterized by:
said housing comprising a base having generally opposed sidewall portions, each provided with an aperture therein;
said cover being provided with a pair of opposed hinge pins at an edge thereof, each of said hinge pins being received within one of said apertures; and
said housing further comprising a bezel, said bezel being fixed to said base, and extending over the edges of said sidewall portions for retention of said hinge pins within said apertures, said bezel including a slot through which said cover extends, said slot accommodating pivotal movement of said cover therethrough.

10. The vanity mirror module of claim 9 characterized by said apertures comprising generally L-shaped slots, each slot being open at an end thereof to one of said sidewall edges;
said module further including means connected to said cover and base for biasing said hinge pins into engagement with the opposite ends of said L-shaped slots.

11. The vanity mirror module of claim 10 characterized by bosses disposed in said base and lug disposed in proximally to said hinge pins, said biasing means comprising coil springs extending between and fastened to corresponding bosses and lugs in said base and cover, respectively.

12. The vanity mirror module of claim 11 characterized by said bezel including a portion received interiorly of said housing base, contiguously with said bosses for retention of said coil springs thereon.

13. In a vanity mirror module for assembly to an automobile sun visor, said module comprising a housing having an interior, a mirror fixed to said housing and an electric circuit disposed within said housing and including at least one electric lamp for illuminating an object to be observed in said mirror, the improvement characterized by:
said housing including at the interior thereof, a first lamp compartment defined by a sidewall structure, said electric lamp being received within said first lamp compartment;
said housing further including a base portion, said sidewall structure upstanding from an inner surface of said base portion;
said housing further including a bezel having an interior disposed over said base portion, said bezel carrying an openable cover for covering said mirror and lamp when not in use;
said bezel, at the interior thereof, being provided with a second lamp compartment defined by a sidewall structure, said housing lamp compartment and said bezel lamp compartment interfitting within one another for mutual alignment therebetween and enhanced minimization of light leakage form said lamp to the interior of the remainder of said housing.

14. The vanity mirror module of claim 13 characterized by said bezel and housing lamp compartments including mutually interengageable fastening means by which said bezel is fixed to said housing.

15. The vanity mirror module of claim 14 wherein said lamp compartments are elongate in shape and said fastening means are formed in the end portions of said lamp compartments for minimization of thermal distortion thereof.

16. The vanity mirror module of claim 14 wherein said fastening means comprises an aperture formed in one of said lamp compartments and a hooked tab formed in the other of said lamp compartments and received within said aperture by a snapping closure therebetween.

17. The vanity mirror module of claim 13 characterized by said lamp compartments providing a controlled emission of a select quantity of light from said lamp compartment, into the interior of said housing,
said electric circuit further including a dimmer control for adjusting the brightness of said lamp, said dimmer control being disposed proximally to said lamp compartments for the backlighting of said control.

18. In a vanity mirror module for assembly to an automobile sun visor, said module comprising a housing, a mirror fixed to said housing, an electric circuit disposed within said housing and including at least one electric lamp for illuminating an object to be observed in said mirror, said mirror module being characterized by:
said housing including a forward wall and a rear wall, said mirror being disposed in said forward wall; and
said electric circuit comprising at least one generally planar metallic member embedded within the rear wall of said housing by molding therewith, for enhanced ease of assembly, structural integrity and maintenance of alignment of said electric circuit within said housing.

19. The vanity mirror module of claim 18 characterized by said circuit including:
a circuit for the controlled dimming of said lamp;
said dimming circuit comprising a plurality of generally aligned terminals;
an elongate resistor fixed within said housing by electrical connection to said terminals; and
a plurality of contacts, each electrically connected to one of said terminals for selected serial electrical connection to a suitable controller.

20. The vanity mirror module of claim 19 characterized by each of said terminals comprising a spring clip.

21. The vanity mirror module of claim 18 characterized by said electric circuit including at least one lamp socket integral therewith.

22. The vanity mirror module of claim 21 characterized by said lamp socket comprising a lamp reflector.

23. The vanity mirror module of claim 18 characterized by said rear wall including a plurality of apertures therein for access to said circuit from the exterior of said housing for convenience in electrically testing said circuit.

* * * * *

UNITED STATES PATENT AND TRADEMARK OFFICE
CERTIFICATE OF CORRECTION

PATENT NO. : 5,267,090
DATED : November 30, 1993
INVENTOR(S) : James D. Dowd, et al It is certified that error appears in the above-indentified patent and that said Letters Patent is hereby corrected as shown below:

Column 5, line 33: "152" should be --157--.

Column 9, line 49: "lug" should be --lugs--.

Column 9, line 50: "proximally to" should be --said cover proximally to--.

Column 10, line 13: "form" should be --from--.

Signed and Sealed this

Nineteenth Day of April, 1994

Attest:

BRUCE LEHMAN

Attesting Officer

Commissioner of Patents and Trademarks